United States Patent [19]

Daun et al.

[11] Patent Number: 5,276,545
[45] Date of Patent: Jan. 4, 1994

[54] MIRROR ALIGNMENT AND DAMPING DEVICE

[75] Inventors: Michael Daun, Madison; Robert R. Badeau, Stoughton; Jack G. Kisslinger, Verona, all of Wis.

[73] Assignee: Nicolet Instrument Corporation, Madison, Wis.

[21] Appl. No.: 328,176

[22] Filed: Mar. 24, 1989

[51] Int. Cl.⁵ .................. G02B 7/18; G02B 26/08
[52] U.S. Cl. ........................... 359/198; 359/223; 359/225; 359/872
[58] Field of Search ............... 350/486, 487, 631, 632; 359/196, 198, 199, 200, 212, 223, 224, 225, 872, 226

[56] References Cited

U.S. PATENT DOCUMENTS

| | | |
|---|---|---|
| 3,359,812 | 12/1967 | Everitt . |
| 3,407,018 | 10/1968 | Miller . |
| 3,528,744 | 9/1970 | Ware . |
| 3,577,791 | 5/1971 | Vanden Broek . |
| 3,729,261 | 4/1973 | Sandercock . |
| 3,796,494 | 3/1974 | Takabayashi . |
| 3,856,382 | 12/1974 | Midland Capital Corporation ............. 350/486 |
| 3,879,112 | 4/1975 | Hickey . |
| 4,053,231 | 10/1977 | Fletcher et al. . |
| 4,060,315 | 11/1977 | Heinz . |
| 4,100,576 | 7/1978 | Ditthardt ........................... 350/486 |
| 4,175,832 | 11/1979 | Umeki et al. ...................... 350/486 |
| 4,203,654 | 5/1980 | Ellis ................................. 350/487 |
| 4,331,384 | 5/1982 | Eisler . |
| 4,345,838 | 8/1982 | Buijs et al. . |
| 4,376,572 | 3/1983 | Gijzen . |
| 4,613,203 | 9/1986 | Proetel et al. . |
| 4,660,941 | 4/1987 | Hattori et al. ................... 350/487 |
| 4,664,487 | 5/1987 | Tam ................................... 350/486 |
| 4,738,500 | 4/1988 | Grupp et al. . |
| 4,744,071 | 5/1988 | Bricot et al. .................... 350/486 |

FOREIGN PATENT DOCUMENTS

| | | |
|---|---|---|
| 901075 | 3/1985 | Belgium . |
| 81201166.6 | 5/1982 | European Pat. Off. . |
| 86114382.2 | 5/1987 | European Pat. Off. . |
| 2036818 | 1/1972 | Fed. Rep. of Germany ...... 350/637 |
| 3213076A1 | 10/1983 | Fed. Rep. of Germany . |

OTHER PUBLICATIONS

B. J. Hogan, "Reactionless Beamsteering May Aim Lasers for SD1," *Designing News*, Sep. 8, 1986, pp. 104-108.
"Positioning Laser Mirrors," *Machine Design*, Sep. 10, 1987, p. 120.
E-A-R; Division, Cabot Corporation; Isodamp C-1000 Series Thermoplastics; 1987.
BEI Motion Systems Company; News Release; Feb. 7, 1986.

*Primary Examiner*—Martin Lerner
*Assistant Examiner*—R. D. Shafer
*Attorney, Agent, or Firm*—Foley & Lardner

[57] ABSTRACT

A mirror alignment and damping device (10) maintains orthogonality between the fixed mirror and the moving mirror in an interferometric spectrometer. The device (10) includes electromagnetic motion imparting units (32, 34, 36, and 38) which have electromagnetic coils (40) and threadedly adjustable pole pieces (44). The electromagnetic motion imparting units (32, 24, 26, and 38) are preferably arranged along perpendicular axes along a base (12) in order to enable independent orthogonal tilting of the mirror (26). Each voice coil consists of a wound wire coil (40) immersed in an annular magnetic field created by permanent magnets (42) which are mounted on a mirror support (44). A course tilt adjust is accomplished by adjusting the pole pieces (44) toward or away from the permanent magnets (42) so as to increase or decrease the gap between the permanent magnets (42) and the pole pieces (44), thereby causing a corresponding increase or decrease in the magnetic forces acting between the magnets (42) and pole pieces (44). A fine adjust is then accomplished by inducing an appropriate current through the wire coils (40). Damping results from the use of a thermoplastic collar which is sandwiched between the base (12) and the mirror support (24).

25 Claims, 2 Drawing Sheets

MIRROR ALIGNMENT AND DAMPING DEVICE

FIELD OF THE INVENTION

The present invention pertains generally to the field of mirror alignment such as that used in Fourier transform interferometric spectrometers, and particularly to mirror alignment devices for maintaining orthogonality between the fixed mirror and the moving mirror in such spectrometers.

BACKGROUND OF THE INVENTION

Fourier transform infrared (FTIR) interferometric spectrometers are widely used in the analysis of chemical compounds. By measuring the absorption of infrared radiation by an unknown sample at various wave lengths in the infrared spectrum and comparing the results with known standards, these instruments generate useful information with respect to the chemical makeup of the unknown sample. In a typical FTIR spectrometer, infrared radiation from an infrared emitting source is collected, passed through an interferometer, passed through the sample to be analyzed, and brought to focus on an infrared detector. The interferometer system, in combination with the sample, modulates the intensity of the infrared radiation that impinges on the detector, and thereby forms a time variant intensity signal. It is the function of the detector to convert this time variant intensity signal to a corresponding time varying current. The current, in turn, is converted to a time varying voltage, which is presented to an analog-to-digital converter and then stored as a sequence of digital numbers to be processed in a processor associated with the spectrometer.

One important feature of the FTIR spectrometer is the moving mirror element that modulates the analytical radiation used by the instrument to study samples. The moving mirror allows a time-domain interferogram to be generated which, when analyzed, allows high resolution frequency-domain spectra to be produced. The computer performs a Fourier transform on the data to produce a spectrum which shows spectral-energy versus frequency.

It is critical in the design of these instruments that the surface of the moving mirror be very accurately held in an orthogonal position, i.e., at a right angle, both to the fixed mirror and to the direction of the motion of the moving mirror. Mirror positional accuracy is crucial because deviations in the mirror alignment produce small errors in the time-domain interferogram which may translate into large errors in the frequency-domain spectrum. In a typical interferometer, mirror deviations larger than one wave length of the analytical radiation used are considered significant and can seriously degrade the quality of the entire instrument.

The alignment of the mirror is ordinarily accomplished by supporting the mirror in a high precision bearing, such as an air bearing, and by attempting to align the bearing to the desired degree of precision. Alignment is usually accomplished by means of differential screws which are manually adjusted to align the moving mirror as perfectly as possible. This is a time consuming procedure requiring significant skill. It also adds to manufacturing expense and to field service costs because realignment is often required. In addition, it mandates the use of extremely accurate bearings which may be very expensive.

Efforts have been made to eliminate the need to manually align the high precision bearings. Although still requiring the use of high precision bearings, automatic static alignment at least relieves the user from performing time consuming realignments. For instance, some devices which automatically align the moving mirror use stepper motors to accomplish substantially automatic simulation of the manual alignment procedure. These devices typically use a computer which aids in the alignment of the static mirror at periodic service intervals. Disadvantages of these devices include slow speed, large size, high cost, and continuing dependence on high precision bearings.

Attempts to eliminate the high precision bearings have heretofore been only marginally successful. To attempt to dynamically tilt either the moving or the fixed mirror to compensate for the tilting of the moving mirror as it moves on its air bearing requires more speed than can be readily obtained with a mechanism based on lead screws and stepper motors.

Dynamic adjustment of the mirror tilt to correct for imprecise bearings and achieve desired alignment has been difficult to accomplish in practice. Such prior adjustment devices tend to be very expensive, slow, bulky, and poor in performance. For example, one device uses piezoelectric positioners to dynamically adjust mirror tilt. However, the positioners are large, expensive, and require one thousand volt drive levels. In addition to being large and expensive, power supplies for such high voltages create undesirable operating hazards.

SUMMARY OF THE INVENTION

The present invention provides an accurate, fast, low cost, and compact mirror tilting mechanism which can be readily incorporated into existing interferometer designs, and can be used to automatically control mirror alignment under static or dynamic conditions and thus eliminate both the dependence on high precision bearings and the need for periodic field realignments. Advantageously, the present invention also provides a mirror tilting mechanism which can be used to statically align an interferometric spectrometer under computer control.

In accordance with the present invention, a magnetic tilting apparatus is constructed which dynamically directs mirror alignment of an interferometer to ensure desired orthogonality. The mirror alignment device includes a rigid central support unit, a compliant, rubberized damper member, and a plurality of electromagnetic force exerting units. The electromagnetic force exerting units may include audio-type voice coils, and are preferably arranged along perpendicular axes to enable independent orthogonal tilting of the mirror. Each voice coil includes a wound wire coil immersed in an annular magnetic field. The annular magnetic field results from the combination of a permanent magnet together with a soft iron pole piece and a soft iron housing. The central support is rigidly connected at one end to the mirror support, on which the mirror is mounted, and at the other end to a housing unit which supports the entire assembly. The central support provides a secure connection between the mirror support and the housing.

The present invention incorporates a course tilt adjust feature which is utilized to bring the mirror into rough alignment during static adjustment or to center it in the range of magnetic travel. Each of the soft iron pole pieces are threaded through a respective coil and may be adjusted so as to protrude from or be withdrawn into the coil in varying degrees. The electromagnetic attractive or repulsive forces between the pole pieces and the permanent magnet at a given adjustment create the course tilt adjust.

Further objects, features, and advantages of the invention will be apparent from the following detailed description taken in conjunction with the accompanying drawings.

DETAILED DESCRIPTION OF THE INVENTION

Figure 1:
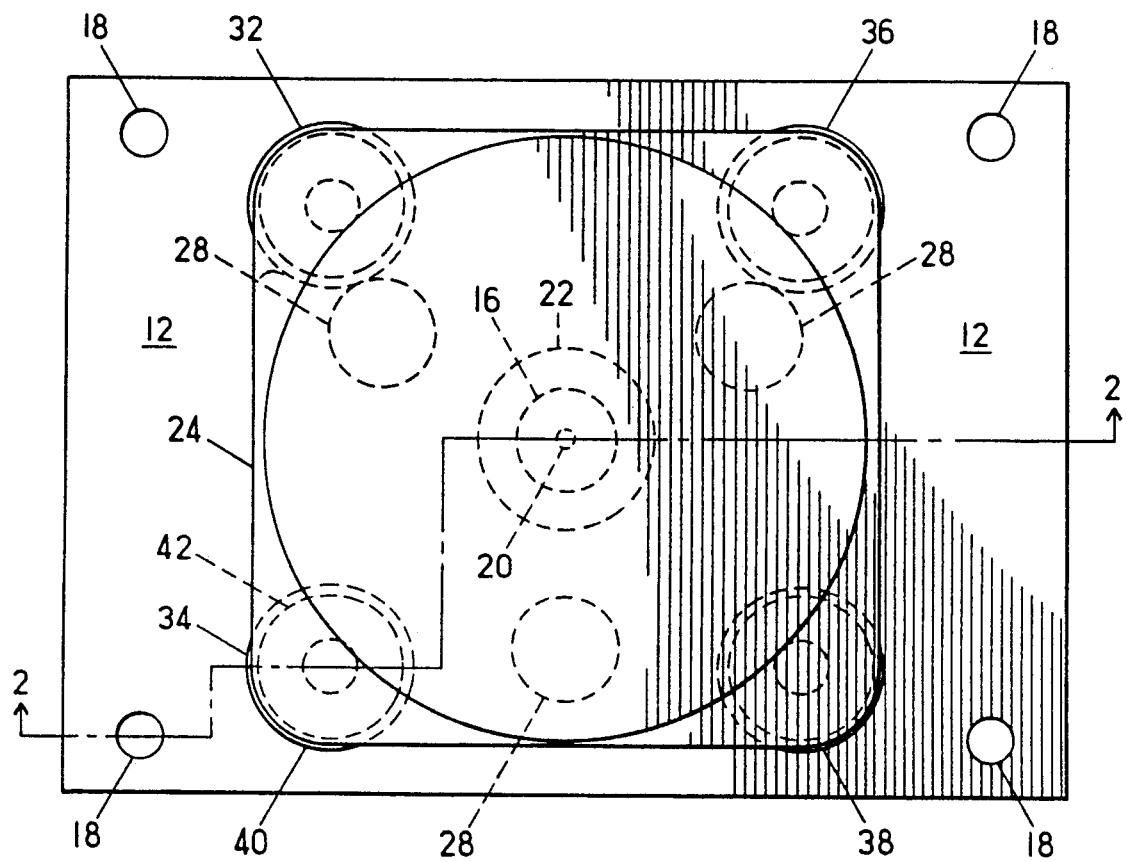
FIG. 1 is a top plan view of the mirror tilting device of the present invention.
Figure 2:
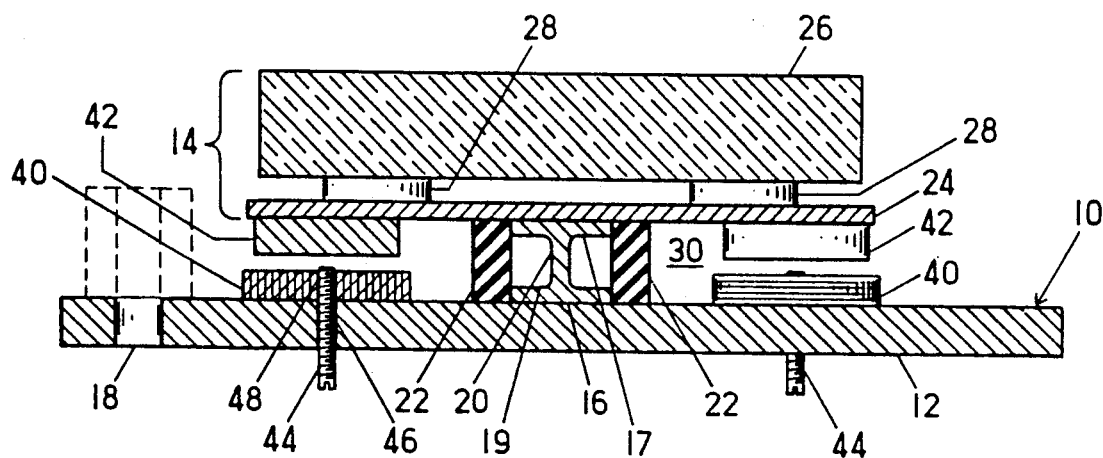
FIG. 2 is a cross-sectional view of the mirror tilting device of FIG. 1 taken along lines 2—2 of FIG. 1.

With reference to the drawings, FIGS. 1 and 2 illustrate the mirror tilting and damping device of the present invention, which is preferably used for statically and dynamically correcting mirror alignment of an interferometer in order to ensure desired orthogonality. The mirror tilting device, generally referred to by reference numberal 10, includes a base 12 which is connected to a mirror assembly 14 by a standoff 16.

The base 12 is a rigid plate-like structure of generally rectangular formation which is used to support the mirror assembly 14. The base 12 is formed of any magnetic material such as, steel or soft iron. Because the base 12 is designed to attach the mirror assembly 14 to an interferometer, the base 12 is also preferably provided with a way to attach the mirror assembly 14 to the base 12, such as attachment holes 18, through which an attachment device, such as, screws or bolts (not shown) may pass.

The standoff 16 is composed of an upper disk 17 and a lower disk 19 which are separated by a resiliently flexible column 20, with these elements being preferably integrally formed together. The standoff may, for example, be formed of stainless steel with the column 20 being sufficiently thin (e.g., 0.125 inch in diameter) that it can flex or bend slightly and resiliently return to its initial position. The lower disk 19 is centered on the base 12 and is attached to the base by means of screws or other fastening means (not shown). A collar 22, preferably composed of viscoelastic material, fits around the standoff 16 and serves as a means of damping the device 10, as explained further below.

The topmost portion of the standoff 16, the upper disk 17, is fixedly connected to the mirror assembly 14 by screws or other fastening means (not shown). The mirror assembly includes a mirror support 24 and a mirror 26. The mirror support 24 is preferably formed of soft steel. The mirror 26 has a bright mirrored finish of the type known to the art. Interposed between the mirror support 24 and the mirror 26 are spacers 28 which may be adhered to the mirror 26 and the plate 24 or which may constitute screws which are threaded through the plate and into the back of the mirror. The space between the mirror 26 and the plate 24 may be filled with adhesive or potting compound (not shown in FIG. 2).

As illustrated in FIG. 2, the separation of the base 12 from the mirror assembly 14 forms a cavity 30. Four electromagnetic units 32, 34, 36 and 38 are mounted between the base 12 and the mirror assembly 14 in the cavity 30 and preferably arranged at the four corners of a square centered on the standoff 16. These units are controllable to exert a desired level of force, attractive or repulsive, between the mirror support plate 24 and the base 12 at the positions where the units are mounted. Although four electromagnetic units are illustrated, it is within the scope of the present invention to have more or less units as desired. The electromagnetic units 32, 34, 36 and 38 preferably include voice coils 40 similar to those found in loud speakers. Each voice coil preferably consists of a wound coil of copper wire attached to the upper surface of the base 12 and immersed in an ambient magnetic field. For each of the electromagnetic units, the ambient magnetic field results from a permanent magnet 42, attached to the lower surface of the mirror support 24, together with a soft iron pole piece 44, which threadedly engages through a bore 46 in the base 12 and extends through a core 48 centrally located in the coil 40. The permanent magnet 42 is preferably made of neodymium, a rare earth metal which has excellent magnetic properties but less mass than other more typical permanent magnets such as those made of iron.

When a current is passed through the windings in the coil 40, the interaction of the permanent magnetic and the electromagnetic fields causes a linearly attractive or repulsive force to be exerted between the coil 40 and the magnet 42. This force is used to regulate the tilt of the mirror support 24 relative to the base 12, subject to the constraints imposed by the standoff 16 and the damping collar 22.

The standoff 16 provides a secure connection between the mirror support 24 and the base 12. The rigidity of the standoff 16 is an important aspect of the invention in that it constrains the motion of the mirror support 24, upon application of signals to the coils 40, in such a way that the magnitude of incremental bending of the central support 20 corresponds to a mirror movement of only a few wavelengths. The maximum desired tilting ability will depend on the quality of the bearing. Thus, greater potential tilting ability will be needed to correct a less precise bearing.

Each of the pole pieces 44 is threaded to mate with threads in a bore 46, the pole pieces 44 being adjustable toward or away from the permament magnets 42. The mirror support 24 moves as the pole pieces 44 are adjusted due to the magnetic forces, either attractive or repulsive, which act between the particular pole piece 44 and the corresponding permanent magnet 42. For example, if the magnetic force between the particular pole piece 44 and the corresponding magnet 42 is attractional, the attraction will increase as the gap between the particular pole piece 44 and the corresponding magnet 42 decreases. The use of the adjustable pole pieces 44 is therefore a means to vary mirror tilt mechanically. The adjustment made by the pole pieces 44 acts as an initial static adjustment to bring the mirror 26 into rough alignment or to center the mirror 26 in the range of magnetic travel. The "fine tuning" of the alignment can then be made by inducing the appropriate current to pass through the coils 40 as discussed above. Because the size of the gap between the end of the pole pieces 44 and the magnets 42 is less critical, assembly and machining tolerances are relaxed.

Figure 3:
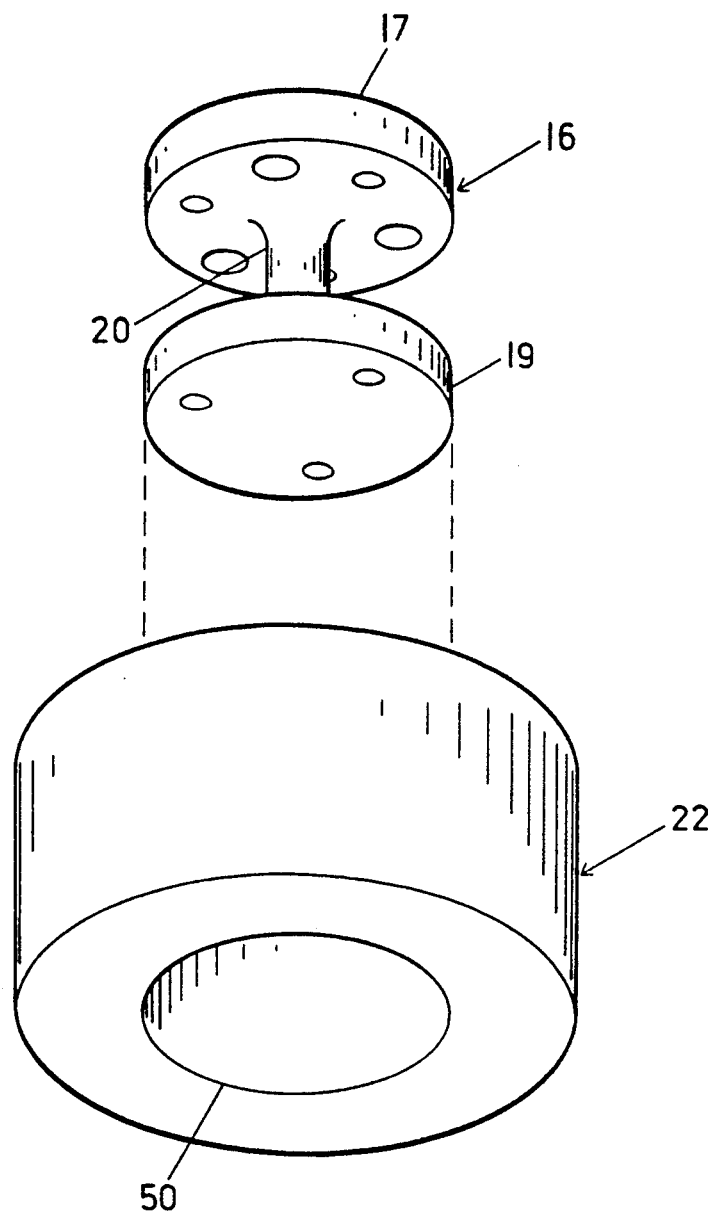
FIG. 3 is an exploded perspective view of the standoff and the viscoelastic damper, showing the insertion of the standoff into the damper.

FIG. 3 shows an exploded perspective of the damping collar 22 in conjunction with the standoff 16. The collar 22 has a hollowed core 50 which fits over the standoff 16 and is sandwiched between the base 12 and the mirror support 24, with the collar 22 being held in place by compression. The collar 22 may be a solid piece, or it may be composed of a plurality of washers. The collar 22 is preferably formed of a viscoelastic shock-absorbing or vibration-absorbing material. A preferred composition for the collar 22 is an energy-absorbing thermoplastic composite, e.g. E-A-R C-1002 Thermoplastic, commercially available through E-A-R Division, Cabot Corporation, Indianapolis, Ind.

There is thus provided by the present invention a mirror tilting and damping device which is easier to manufacture, smaller in size, of increased durability, and having a higher response speed than prior art mirror tilting devices. The invention facilitates both static and dynamic mirror alignments and may be used to increase performance of substantially any interferometer design, whether or not high precision bearings are used to guide the moving mirror. The mirror tilting device of the present invention can easily obtain a response speed of several hundred Hertz, sufficient for dynamic correction of the moving mirror. Unlike prior art devices, which are not connected to the moving interferometer mirror because the large mass of such devices adds too much inertia, the invention may be readily used on either the moving mirror or the fixed mirror. Moreover, it will be appreciated that the principles of the present invention may be applied to a variety of spectrometric inventions, other than FTIR spectrometers of the type specifically described above, and may be applied to a variety of other applications which employ mirror alignment and damping. It is therefore to be understood that the invention is not confined to the particular construction and arrangement of parts herein illustrated and described, but embraces such modified forms thereof as come within the scope of the following claims.

What is claimed is:

1. A mirror tilting device for aligning a mirror in a spectrometer comprising:
   (a) a base unit;
   (b) a mirror support;
   (c) means for mounting the mirror support to the base unit to allow resilient pivoting of the mirror support about an initial position to tilt the mirror support when force is applied to the mirror support;
   (d) a plurality of electromagnetic force exerting units positioned between the base unit and the mirror support, the electromagnetic force exerting units arranged along perpendicular axes to enable orthogonal tilting of the mirror support, the electromagnetic units each including a permanent magnet and a coil activatable by an electric current to regulate the tilt of the mirror support, and a pole piece mounted to be adjustably advanced toward or withdrawn away from the permanent magnet to a position such that the initial orientation of the mirror support with no current flowing in the coils is regulated by magnetic forces between the pole pieces and the permanent magnets.

2. A mirror tilting device for aligning a mirror in a spectrometer comprising:
   (a) a base unit;
   (b) a mirror support;
   (c) means for mounting the mirror support to the base unit to allow resilient pivoting of the mirror support about an initial position to tilt the mirror support when force is applied to the mirror support;
   (d) a plurality of electromagnetic force exerting units positioned between the base unit and the mirror support, the electromagnetic units each including a permanent magnet and a coil activatable by an electric current to regulate the tilt of the mirror support, and a pole piece mounted to be adjustably advanced toward or withdrawn away from the permanent magnet, wherein the pole pieces threadedly engage with bores in the base unit and the adjustment of the pole pieces is accomplished by the turning of the pole pieces in their respective bores, the orientation of the mirror support being regulated by magnetic forces between the pole pieces and the permanent magnets that vary as the pole pieces are adjusted.

3. The device of claim 2 wherein the permanent magnet is a neodymium permanent magnet.

4. A mirror tilting device for aligning a mirror in a spectrometer comprising:
   (a) a base unit;
   (b) a mirror support;
   (c) means for mounting the mirror support to the base unit to allow resilient pivoting of the mirror support about an initial position to tilt the mirror support when force is applied to the mirror support wherein the means for mounting the mirror support to the base unit is a standoff having a resiliently flexible central column centrally located between the base unit and the mirror support;
   (d) a plurality of electromagnetic force exerting units positioned between the base unit and the mirror support, the electromagnetic units each including a permanent magnet and a coil activatable by an electric current to regulate the tilt of the mirror support, and a pole piece mounted to be adjustably advanced toward or withdrawn away from the permanent magnet, the orientation of the mirror support being regulated by magnetic forces between the pole pieces and the permanent magnets that vary as the pole pieces are adjusted, and wherein the separation between the base unit and the mirror support defines a cavity for receiving the electromagnetic force exerting units.

5. The device of claim 4 further comprising a means for damping positioned between the mirror support and the base unit.

6. The device of claim 5 wherein the means for damping comprises a collar that surrounds the standoff and separates the mirror support from the base unit, the collar being made out of viscoelastic shock-absorbing material.

7. The device of claim 6 wherein the collar is made of energy-absorbing thermoplastic.

8. The device of claim 6 wherein the collar is held in place between the mirror support and the base unit by a compressive force.

9. The device of claim 4 wherein the plurality of electromagnetic force exerting units are arranged along perpendicular axes.

10. The device of claim 4 wherein there are four electromagnetic force exerting units arranged along perpendicular axes.

11. The device according to claim 4 wherein the plurality of electromagnetic force exerting units includes four coil arrangements arranged in perpendicular axis emanating from the standoff and wherein opposite pairs of the coil arrangements have their windings connected together such that an electrical current passing through one pair cases tilt in one axis of the mirror support while an electrical current passing through the other pair causes tilt about an orthogonal axis.

12. A mirror tilting device for aligning a mirror in a spectrometer comprising:
   (a) a base unit;
   (b) a mirror support;
   (c) means for mounting the mirror support to the base unit to allow resilient pivoting of the mirror support about an initial position to tilt the mirror support when force is applied to the mirror support wherein the means for mounting the mirror support to the base unit is a standoff having a resiliently flexible central column centrally located between the base unit and the mirror support,
   (d) a plurality of electromagnetic force exerting units positioned between the base unit and the mirror support, the electromagnetic units each including a permanent magnet and a coil activatable by an electric current to regulate the tilt of the mirror support relative to the base unit; and
   (e) means for damping positioned between the mirror support and the base unit wherein the means for damping comprises a collar that surrounds the standoff and separates the mirror support from the base unit, the collar being made out of viscoelastic shock-absorbing material.

13. The device of claim 12 wherein the collar is made out of energy-absorbing thermoplastic.

14. The device of claim 12 wherein the collar is held in place between the mirror support and the base unit by compressive forces.

15. The device of claim 12 wherein the plurality of electromagnetic force exerting units is preferably arranged along a perpendicular axis emanating from the standoff.

16. The device of claim 12 comprising four electromagnetic force exerting units in perpendicular axes emanating from the standoff.

17. The device of claim 12 wherein the plurality of electromagnetic force exerting units are coils consisting of a winding of wire coil immersed in an annular magnetic field.

18. The device of claim 12 wherein the permanent magnet is a neodymium permanent magnet.

19. A mirror tilting device for aligning a mirror in a spectrometer comprising:
   (a) a base unit;
   (b) a mirror support;
   (c) means for mounting the mirror support to the base unit to allow resilient pivoting of the mirror support about an initial position to tilt the mirror support when force is applied to the mirror support, wherein the means for mounting the mirror support to the base unit is a standoff having a resiliently flexible central column centrally located between the base unit and the mirror support;
   (d) a plurality of electromagnetic force exerting units positioned between the base unit and the mirror support, the electromagnetic units each including a permanent magnet and a coil activatable by an electric current to regulate the tilt of the mirror support relative to the base unit, wherein the separation defines a cavity for receiving the electromagnetic force exerting units, and wherein the plurality of electromagnetic force exerting units includes four coil arrangements arranged in perpendicular axes emanating from the standoff and wherein opposite pairs of the coil arrangements have their windings connected together such that an electrical current passing through one pair causes tilt in one axis of the mirror support while an electrical current passing through the other pair causes tilt about an orthogonal axis; and
   (e) means for damping positioned between the mirror support and the base unit.

20. A mirror tilting device for aligning a mirror in a spectrometer comprising:
   (a) a base unit;
   (b) a mirror support;
   (c) means for mounting the mirror support to the base unit to allow resilient pivoting of the mirror support about an initial position to tilt the mirror support when force is applied to the mirror support;
   (d) a plurality of electromagnetic force exerting units positioned between the base unit and the mirror support, the electromagnetic force exerting units arranged about perpendicular axes to enable orthogonal tilting of the mirror support, the electromagnetic units each including a permanent magnet and a coil activatable by an electric current to regulate the tilt of the mirror support, and a pole piece mounted to be adjustably advanced toward or withdrawn away from the permanent magnet to a position such that the initial orientation of the mirror support with no current flowing in the coils is regulated by magnetic forces between the pole pieces and the permanent magnets;
   (e) means for damping between the mirror support and the base unit.

21. A mirror tilting device for aligning a mirror in a spectrometer comprising:
   (a) a base unit;
   (b) a mirror support;
   (c) means for mounting the mirror support to the base unit to allow resilient pivoting of the mirror support about an initial position to tilt the mirror support when force is applied to the mirror support;
   (d) a plurality of electromagnetic force exerting units positioned between the base unit and the mirror support, the electromagnetic units each including a permanent magnet and a coil activatable by an electric current to regulate the tilt of the mirror support, and a pole piece mounted to be adjustably advanced toward or withdrawn away from the permanent magnet, the orientation of the mirror support being regulated by magnetic forces between the pole pieces and the permanent magnets that vary as the pole pieces are adjusted, wherein the pole pieces threadedly engage with bores in the base unit and adjustment of the pole pieces is accomplished by turning the pole pieces in their respective bores;
   (e) means for damping between the mirror support and the base unit.

22. A mirror tilting device for aligning a mirror in a spectrometer comprising:
   (a) a base unit;
   (b) a mirror support;
   (c) means for mounting the mirror support to the base unit to allow resilient pivoting of the mirror support about an initial position to tilt the mirror support when force is applied to the mirror support, wherein the means for mounting the mirror support to the base unit is a standoff having a resiliently flexible central column centrally located between the base unit and the mirror support, and the separation between the base unit and the mirror support defines a cavity for receiving electromagnetic force exerting units;

(d) a plurality of electromagnetic force exerting units positioned between the base unit and the mirror support, the electromagnetic units each including a permanent magnet and a coil activatable by an electric current to regulate the tilt of the mirror support, and a pole piece mounted to be adjustably advanced toward or withdrawn away from the permanent magnet, the orientation of the mirror support being regulated by magnetic forces between the pole pieces and the permanent magnets that vary as the pole pieces are adjusted; and (e) means for damping between the mirror support and the base unit.

23. The device of claim 22 wherein the means for damping comprises a collar that surrounds the standoff and separates the mirror support from the base unit, the collar being made out of viscoelastic shock-absorbing material.

24. The device of claim 23 wherein the collar is made of energy-absorbing thermoplastic.

25. The device of claim 23 wherein the collar is held in place between the mirror support and the base unit by compressive forces.

* * * * *